(12) United States Patent
Raikin et al.

(10) Patent No.: US 8,341,356 B2
(45) Date of Patent: Dec. 25, 2012

(54) PROTECTED CACHE ARCHITECTURE AND SECURE PROGRAMMING PARADIGM TO PROTECT APPLICATIONS

(75) Inventors: Shlomo Raikin, Carmel (IL); Shay Gueron, Haifa (IL); Gad Sheaffer, Haifa (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/099,479

(22) Filed: May 3, 2011

(65) Prior Publication Data

US 2011/0208907 A1    Aug. 25, 2011

Related U.S. Application Data

(63) Continuation of application No. 11/998,902, filed on Dec. 3, 2007, now Pat. No. 7,958,320.

(60) Provisional application No. 60/873,051, filed on Dec. 5, 2006.

(51) Int. Cl.
*G06F 12/06* (2006.01)

(52) U.S. Cl. .................. 711/135; 711/163; 711/E12.037

(58) Field of Classification Search .................. 711/141, 711/150, 144, 163, 164, E12.037, E12.078, 711/105, 135, 137, E12.062
See application file for complete search history.

(56) References Cited

U.S. PATENT DOCUMENTS

| | | | |
|---|---|---|---|
| 6,360,299 B1 | 3/2002 | Arimilli et al. | |
| 6,539,092 B1* | 3/2003 | Kocher | 713/193 |
| 6,990,557 B2 | 1/2006 | Hokenek et al. | |
| 7,350,028 B2* | 3/2008 | Cameron et al. | 711/135 |
| 7,673,345 B2* | 3/2010 | Cheng et al. | 711/163 |
| 8,028,341 B2* | 9/2011 | Cheng et al. | 711/163 |
| 2006/0143390 A1 | 6/2006 | Kottapalli | |
| 2008/0016278 A1 | 1/2008 | Clark et al. | |
| 2008/0195849 A1 | 8/2008 | Gonzalez et al. | |
| 2009/0006755 A1 | 1/2009 | Illikkal et al. | |
| 2009/0089564 A1 | 4/2009 | Brickell et al. | |
| 2010/0050266 A1* | 2/2010 | Cheng et al. | 711/163 |
| 2011/0099335 A1* | 4/2011 | Scott et al. | 711/141 |

OTHER PUBLICATIONS

U.S. Patent and Trademark Office, Office Action mailed Oct. 4, 2010 with Reply filed on Jan. 4, 2010 in U.S. Appl. No. 11/823,325.
U.S. Patent and Trademark Office, Final Office Action mailed Jan. 19, 2011 with Reply to Final filed Mar. 10, 2011 in U.S. Appl. No. 11/823,325.

* cited by examiner

*Primary Examiner* — Pierre-Michel Bataille
(74) *Attorney, Agent, or Firm* — Trop, Pruner & Hu, P.C.

(57) ABSTRACT

Embodiments of the present invention provide a secure programming paradigm, and a protected cache that enable a processor to handle secret/private information while preventing, at the hardware level, malicious applications from accessing this information by circumventing the other protection mechanisms. A protected cache may be used as a building block to enhance the security of applications trying to create, manage and protect secure data. Other embodiments are described and claimed.

18 Claims, 3 Drawing Sheets

PROTECTED CACHE ARCHITECTURE AND SECURE PROGRAMMING PARADIGM TO PROTECT APPLICATIONS

This application is a continuation of U.S. patent application Ser. No. 11/998,902, filed Dec. 3, 2007, now U.S. Pat. No. 7,958,320, issued Jun. 7, 2011, the content of which is hereby incorporated by reference, and which in turn claims priority to U.S. Provisional Patent Application No. 60/873,051 filed on Dec. 5, 2006.

BACKGROUND

Embodiments of the present invention relate generally to computer security and processor architecture and, more specifically, to a protected cache in a processor.

Personal computer (PC) platforms are susceptible to various types of attacks that attempt, among other goals, to steal secrets, to illegitimately take control of the platform, illegitimately access protected/private areas of other processes, and to circumvent policy enforcement mechanisms. The increased value of content on the platform encourages sophisticated attacks on software and hardware, especially if the content falls under the "break once, run everywhere" (BORE) threat model.

Some viruses/malware can use holes in the operating system (OS) (sometimes even combined with physical tampering with the platform firmware to insert malicious code) to try to access private data of other applications by bypassing the virtual address separation and address translation mappings enforced by the OS. Particularly dangerous are malicious applications that exploit security holes and access the memory space of other applications. Recent examples are Blue Pill, Vitriol and SubVirt. Enhanced protection against existing and potential attacks on the platform is an emerging requirement.

DETAILED DESCRIPTION

Figure 1:
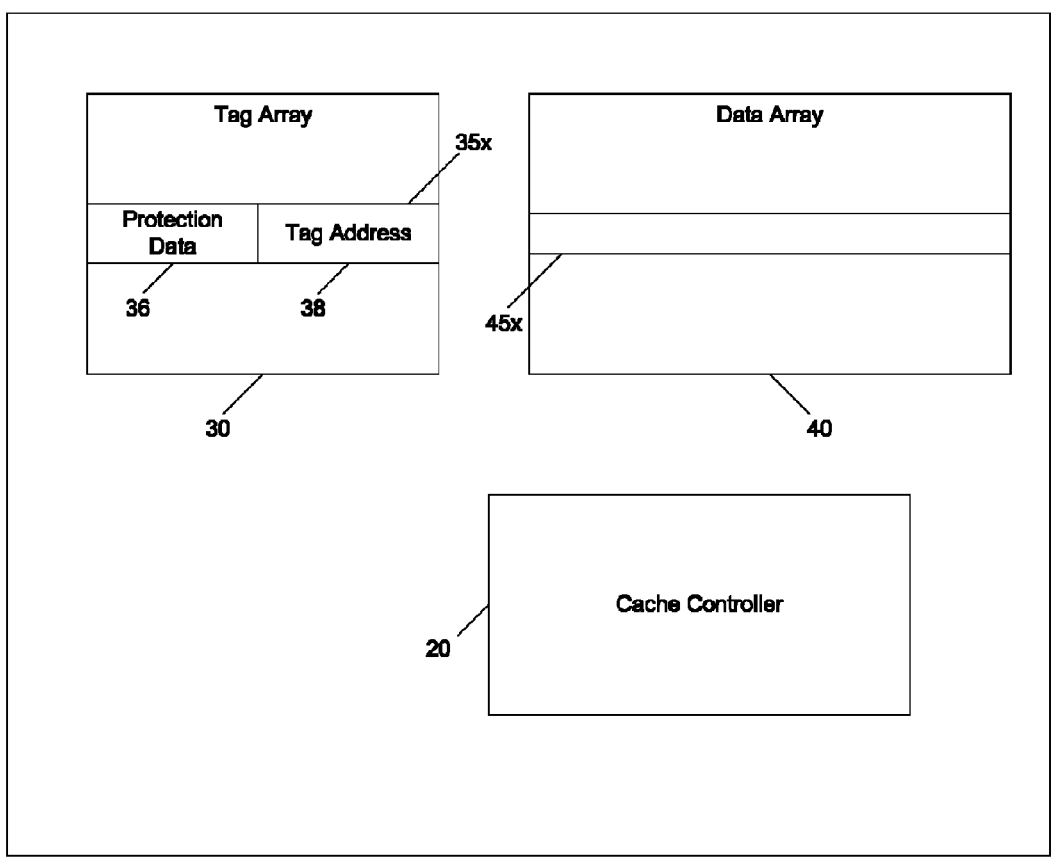
FIG. 1 is a block diagram of a cache memory in accordance with one embodiment of the present invention.

Embodiments of the present invention provide a secure programming paradigm, and properties for protected caches that enable a processor to handle secret/private information while preventing, at the hardware level, malicious applications from accessing this information by circumventing the virtual address separation and address translation mappings enforced by the OS. That is, a malicious application such as a spyware program can possibly defeat the paging or security mechanisms of an OS or virtual machine (VM) such that it is able to access the same physical address space of another thread, such as a thread on which a secure application is running. In various embodiments, even in the presence of such malicious code that is able to circumvent these enforcement mechanisms, embodiments still can provide a defense to the malicious code.

This mechanism can be used by any application, where some typical examples are Digital Rights Management (DRM) applications, disk encryption applications, networking applications and any other application that needs to handle and manipulate cryptographic keys and encrypted/decrypted data without the concern of being observed by other programs.

As one example, embodiments may be used to prevent a so-called side channel attack in which an attacker program and a victim program (in this example, a secure application) both use the same physical cache. In other words, these two hardware threads use the same cache such that when the attacker program is swapped into the processor state in place of the victim program, the data of the victim program in the cache is evicted and vice-versa. During operation when the attacker program is being swapped in again, it can identify which parts of its own data was evicted by observing the latency of its read operations. By repeating that process, the attacker can infer information about the access patterns of the victim program and expose a private key associated with the victim program, thus enabling the attacker program to access the private data of the victim.

Instead, according to various embodiments such an attack by an attacker program, such as spyware, can be thwarted by preventing these repeated evictions of data of the victim program by the attacker program. As will be described further below, various mechanisms may be provided to prevent such evictions.

Reference in the specification to "one embodiment" or "an embodiment" of the present invention means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

A protected cache may be used as a building block to enhance the security of applications trying to create, manage and protect secure data. This section illustrates a set of properties for a protected cache in accordance with an embodiment of the present invention. In one embodiment, a protected cache can be an extension of a standard cache. That is, in such implementations the protected cache may be included within a given cache structure such as a local cache associated with a processor, e.g., a level 1 (L1) cache, although the scope of the present invention is not so limited. For example, in other embodiments a separate cache structure may be provided for the protected cache. In still other embodiments, the protected cache may be part of another cache structure such as a level 0, level 2, last level cache (LLC) or other such cache structure.

In one embodiment, the protected cache can provide two different address spaces. The first address space may be a totally private address space used as a private scratch pad. No snoop traffic can be generated to this space, as it is non-coherent. Also a simultaneous multithreading (SMT) thread running simultaneously on the same core cannot access this private space. The only thing that can hurt this space is evictions. The second address space may be a fully coherent address space that can also be annotated (i.e., tagged with protection information) in accordance with an embodiment of the present invention.

Referring now to FIG. 1, shown is a block diagram of a cache memory in accordance with one embodiment of the present invention. As shown in FIG. 1, cache memory 10, which may be an L1 cache memory, includes a cache controller 20, a tag array 30, and a data array 40. Cache controller 20 may handle control operations for the cache memory such that it receives incoming requests and handles them to enable reading and writing of data into tag array 30 and data array 40. In various embodiments, cache controller 20 may also handle control of access to given cache lines based on information provided by a requestor and/or information in tag array 30. Similarly, cache controller 20 may handle evictions of cache lines in accordance with an embodiment of the present invention.

As shown in FIG. 1, tag array 30 may be adapted to store tag information. Specifically, tag array 30 may be arranged including a plurality of tag lines $35_x$ (generically tag line 35), each of which corresponds to a corresponding cache line $45_x$ (generically cache line 45) of data array 40. Each tag line 35 may include a protection portion 36 to store protection data and a tag address portion 38 to store a tag address, which may be used to access the corresponding cache line 45 in data array 40. While shown as separate arrays in the embodiment of FIG. 1, the scope of the present invention is not limited in this regard and in other implementations the tag array and data array may be combined.

As will be described further below, protection portion 36 may include one or more control bits to control access to a corresponding cache line 45. In one embodiment, separate protection indicators may include a protection indicator, read access indicator, write access indicator, eviction indicator, protection level indicator, snoop indicator and so forth. As one example, the protection indicator may indicate that the corresponding cache line is a protected cache line, the read and write access indicators may indicate whether read or write access to the protected cache line is permitted, the eviction indicator may indicate if eviction by another agent (i.e., different than the application that wrote it) requires a notification of the eviction to the victim application, while the protection level indicator may indicate a relative protection level, in embodiments in which multiple protection levels exist. The snoop indicator may indicate whether snooping of the protected cache is permitted. In some embodiments, the snoop indicator can be merged with the read-write indicators in an implementation that does not support SMT. This information 36 may be present for those associated tag lines 35 that are associated with a corresponding protected cache line 45. In contrast, for an unprotected cache line 45, its corresponding tag line 35 does not include protection data.

As will be described further below, in one embodiment cache memory 10 may be arranged as an M-way N-set associative memory, although other implementations are possible. In this way, control of protected information may be made on a per set and per way basis. While shown with this particular implementation in the embodiment of FIG. 1, the scope of the present invention is not limited in this regard.

A protected cache can hold data which is non-coherent and private to a caching agent (i.e., the agent that cached the data) only. Data written to the protected cache is private to the hardware thread that wrote it. The protected cache is, in a sense, a big private scratchpad intended for the use of the processor to generate intermediate results. Since the data in the protected cache is non-coherent and resides in a private memory space, it cannot be snooped by another caching agent or by a simultaneous multi-threading (SMT) thread sharing the same cache.

There is a mechanism to inform the processor of any event where one of the lines tagged as private is chosen as victim for eviction, and being evicted. As will be described further below, based on the number of times private data is evicted from the cache, one or more mechanisms may be enacted to prevent future such evictions, particularly where it is likely that these evictions are as a result of malicious activity.

In order to prevent tagged data from being chosen as victim for eviction, a least recently used (LRU) mechanism is set to favor tagged lines. In other words, an LRU mechanism may be adapted to prevent tagged (i.e., protected) lines from being evicted. In one such embodiment, an LRU algorithm may cause eviction of any non-protected cache lines from a given set prior to eviction of any protected cache lines, although other implementations are possible.

A mechanism for flushing all private data in the protected cache may be used. This mechanism could be used by the application to erase private data after the calculations are done. Further, a mechanism to flush the protected cache on a ring transition may also be used. This mechanism ensures that data which is private to one application will not be visible to another application sharing the same cache after a context switch. Note that this flushing may act to discard the data such that it is no longer present in the protected cache or any other storage location.

One embodiment of a usage model of the protected cache can be described as the following Secure Programming Paradigm. To protect its sensitive memory space, a Security and Privacy Aware (SPA) application can use tagged stores and loads in order to handle its private data. That is, as described further below, special user-level instructions can be used to enable protected reads and writes from and to the protected cache. When such cache operations are identified as protected, a cache controller can identify the corresponding cache lines accordingly (e.g., by setting of various protection bits within protection data associated with a protected cache line). Then the cache controller can handle the cache line accordingly, with regard to write and read accesses, as well as evictions.

The protected cache has performance implications for the computer system. The throughput and latency of accessing the protected cache is the same as of the L1 data cache in embodiments in which the protected cache is part of the L1 cache. However, the protected cache differs from regular caches in other respects. With regular caches, a modified line that is evicted can be later read from higher level of caches or from main memory. In contrast, data tagged as private cannot be recovered after eviction. Since evicted data needs to be re-generated, the use of the protected cache carries performance implications. Consequently, only applications that need private storage which is invisible to any other application would find it useful to use the protected cache capabilities.

In addition, all data tagged as private cannot be live-out of the program since the memory space that the protected cache uses is non-coherent. In other words, the protected cache can only be used for intermediate calculations.

In one embodiment, the protected cache can be accessed by introducing two new instructions: a protected read instruction which enables reading from private storage and a protected write instruction to enable writing to private storage.

Thus a SPA application can write private data to the protected cache using the protected write instruction and correspondingly read such protected data using the protected read instruction. In the absence of such a protected read instruction by the SPA application that wrote the protected data to the protected cache, the cache controller may prevent reading of that protected data by another application. This protection may come in several forms. First, the cache controller may determine that an incoming read request for a protected cache line is from a different hardware thread than the thread that wrote the data. If so, the cache controller may prevent the read access and notify the application. Alternately, if the read instruction is a non-protected read request, i.e., a normal read request, the cache controller may prevent the read access and notify the application. Furthermore, as described above snoops and other requests for access to a protected cache location originating from another agent (e.g., originating from another hardware thread, core or other system agent) may also be prevented by the cache controller.

All required calculations using private data in a protected cache line can be performed by reading the private data from the protected cache line to a register, carrying out the required calculations, and writing the data back to protected cache. That is, applications that use the protected cache would view the processor behavior as a load-store machine, using register-to-register arithmetic logic unit (ALU) operations. In one embodiment, another indicator of the protected data may indicate that register-memory operations are not to be permitted. Thus when set, this indicator only allows the writing of protected data accessed from the protected cache line to be first written into a register prior to any operations on that data.

An alternative approach would be to introduce a secure prefix that would turn all instructions to instructions operating on the private memory space. This would allow register-memory operations. Thus for this alternative approach, this indicator may be reset to a logic zero state to indicate that such register-memory operations are permitted, if the access request is associated with an instruction having a secure prefix.

Application of the Secure Programming Paradigm in practice may be achieved as follows. An SPA application that uses the secure programming paradigm needs to face the performance consequences of lost data caused by eviction of tagged lines. This could potentially lead to a live lock situation in which an application cannot make forward progress, or become a platform for launching a Denial of Service attack. A live lock situation could occur if tagged lines are repeatedly evicted from the cache, causing the tag lines to be re-written into the protected cache after each such eviction, impeding the flow of forward progress in the application. This is so, since as described above the protected data is not available in other cache locations or main memory and thus needs to be rewritten into the cache by the application itself.

If the SPA application writes some data to the protected cache and another core/thread accesses the same set, the tagged line can be victimized. This does not even have to be malicious; in fact, the same thread can, unintentionally, cause such eviction. Consequently, the SPA application cannot guarantee progress.

The properties of the protected cache can be used to mitigate live locks. In order to ensure that tagged data would not be chosen as victim for replacement, the application should only write less tagged lines per set than the number of ways per set, and use the LRU property described above. Set selection logic is globally known, and uses a subset of the bits of the address of the data, which is in the control of the application.

To completely prevent other applications from accessing the private data of an SPA application, the application can use the mechanism described above and write tagged data to a unique, private physical memory space. Combining that with the LRU property also described above will ensure private data can not be victimized or evicted due to an external snoop.

Figure 2:
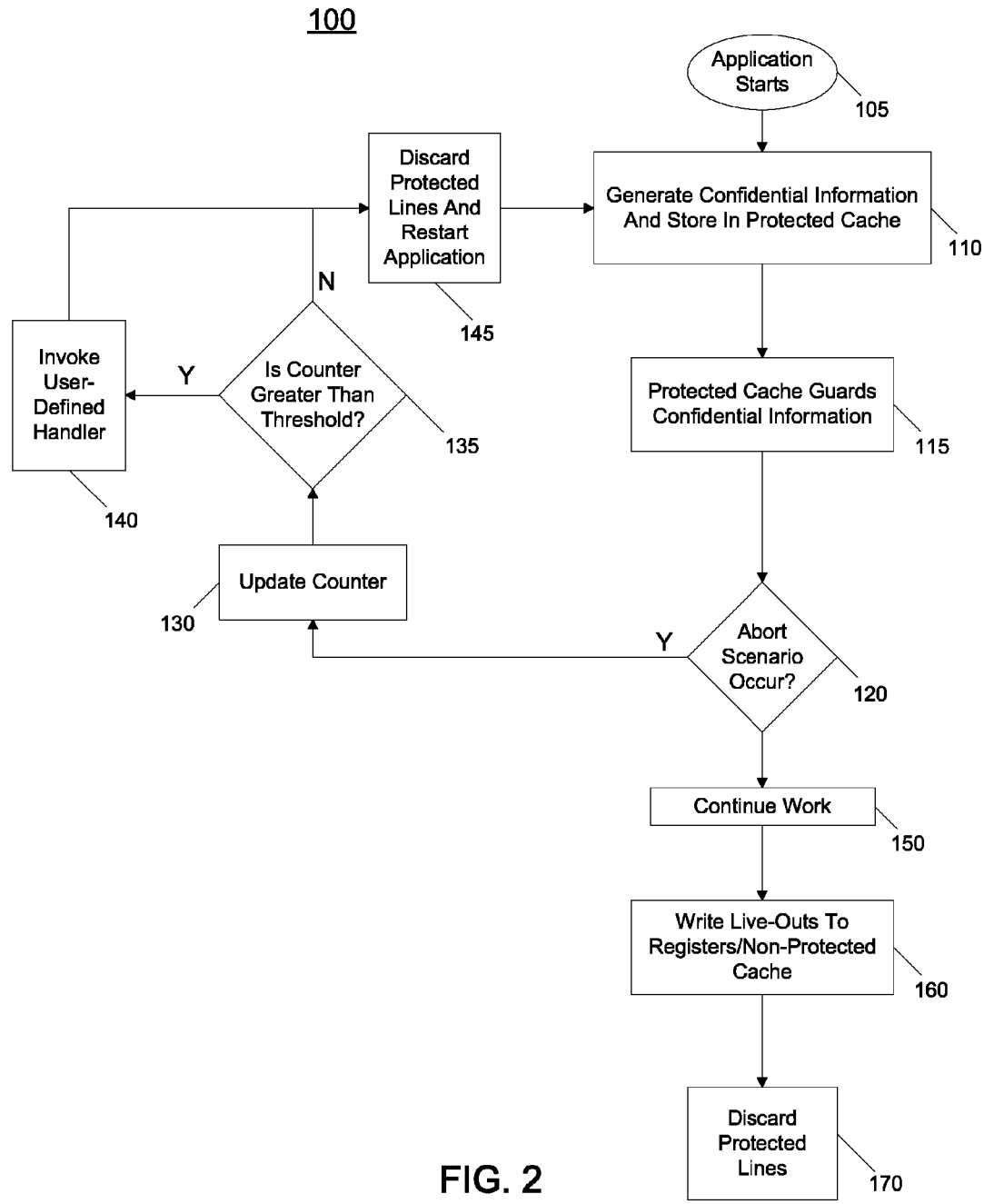
FIG. 2 is a flow diagram of a method of using a protected cache in accordance with one embodiment of the present invention.

Referring now to FIG. 2, shown is a flow diagram of a method of using a protected cache in accordance with one embodiment of the present invention. As shown in FIG. 2, method 100 may begin by starting an application (block 105) such as an SPA application. During execution of the application, the application may generate confidential information, in the form, e.g., of temporary data, interim results and so forth. This generated confidential information may be stored in a protected cache (block 110). More specifically, the SPA application may write the confidential information to a protected portion of, e.g., an L1 cache using a protected write operation, in one embodiment. For example, assume that a cache line's worth of data is to be written to a protected storage location. Accordingly, the application may issue a protected write operation to write the protected data to a protected cache line in the L1 cache. In connection with writing this data, a cache controller or other logic of the cache memory may also write corresponding protection information, e.g., state bits, each for a given protection mechanism associated with the line, which may be in some embodiments within the cache line itself or in a corresponding entry of a tag array. In this way, the protected cache guards this confidential information (block 115). This guarding may take different forms, including guarding against write access, read access, snoop access, eviction and so forth.

Referring still to FIG. 2, next it may be determined whether an abort scenario occurs (diamond 120). For example, such an abort scenario may occur if an improper access to the cache line is sought or occurs. In one particular embodiment, an abort scenario may occur when a protected cache line is evicted from the cache. That is, as described above, such eviction, if in a continuous manner, may indicate an attacker code is present and trying to access the protected data. However, in other implementations abort scenarios may occur on an improper attempt to otherwise access the data that is protected in a certain manner. For example, an abort could occur when another SMT thread is trying to access the protected cache line.

If such an abort scenario is determined, control passes from diamond 120 to block 130 wherein a counter may be updated. This counter may be associated with a number of evictions from protected cache lines, although other variations are possible, such as a dedicated counter for each protected cache line, or counters to count other attempted accesses to protected cache lines such as reads, writes and so forth.

Next, it may be determined whether the counter value is greater than a predetermined threshold (diamond 135). If the count value is lower than the threshold, control passes to block 145, where the protected lines may be discarded and the application restarted. That is, the cache lines are removed from the protected cache and are not written elsewhere and thus they are discarded. This stands in contrast to eviction of regular data from a non-protected cache location in which the data to be evicted is written to another portion of a memory hierarchy such as another cache level or main memory. Control then can pass back to block 110, where the confidential information may be re-generated during execution of the application.

Because such repeated discarding of protected data and restarting of the application can lead to a live lock situation and thus prevention of forward progress, if at diamond 135 it is determined that the counter value is greater than the threshold, control passes to block 140 where a user-defined handler may be invoked. Such handler may vary in different embodiments, depending on a given implementation of a usage model. However, in one embodiment the user defined handler may cause an isolation message to be sent to the OS. Specifically, this message may request scheduling of no other tasks, interrupts or break events to the given core for a given amount of time, e.g., a number of machine cycles, real time or so forth, to enable the application to complete its processing. Thus this message to the OS may indicate the lack of forward progress as a result of the continued evictions of protected data, and thus seek a dedicated time for execution of the application before being interrupted by another task. Other handler behavior may include taking a different code path, such as to alert the user that "You Are Under Security Attack" and halt the application.

Referring still to FIG. 2, if instead at diamond 120 it is determined that no abort scenario occurs, the application may continue its work (block 150). For example, the application may make needed calculations and so forth, using the protected cache to store interim data results and so forth. At the conclusion of processing, the application may write live-outs to registers or non-protected cache locations (block 160). Finally, the application may cause all protected cache lines associated with it to be discarded (block 170). Again, as described above the discarding of cache lines means that they are removed from the protected cache locations without a corresponding writing of the data to another location in the memory hierarchy. While shown with this particular implementation in the embodiment of FIG. 2, the scope of the present invention is not limited in this regard.

There are several examples for applications that would need protection against accessing their private cache, and to which the secure programming paradigm may be helpful, as follows.

A high definition digital versatile disk (HD-DVD) player receives an encrypted compressed video stream, decrypts it, and decompresses it. Temporary results need to be stored in memory. Furthermore, if the uncompressed stream needs to be re-encrypted before being sent to a display, intermediate un-encrypted results need to be stored in the cache. A malicious code that compromises this data in any of the intermediate steps, defeats the digital rights management (DRM) protection. Therefore, writing such an application under the secure programming paradigm, while running it on a processor that supports these features, increases the security level of the application, as the temporary results can be written into the protected cache and only accessed by the application.

A server that processes connections with numerous clients, exchanges keys using some public key cryptographic protocol, generates session keys for symmetric encryptions, and signs data with a secret key. It needs to protect key material and intermediate results that are moved to the cache, which can be achieved by writing this into the protected cache locations using, e.g., the protected write instruction described above. An application that needs to authenticate a certain piece of data must be able to guarantee its integrity. Storing data in an "untouchable" cache can protect such data integrity.

Embodiments of the present invention thus offer a programming paradigm for security and privacy. This provides for better protection against malicious software and increases the level of security in processor architectures.

Although the operations described herein may be described as a sequential process, some of the operations may in fact be performed in parallel or concurrently. In addition, in some embodiments the order of the operations may be rearranged.

The techniques described herein are not limited to any particular hardware or software configuration; they may find applicability in any computing or processing environment. The techniques may be implemented in hardware, software, or a combination of the two. The techniques may be implemented in programs executing on programmable machines such as mobile or stationary computers, personal digital assistants, set top boxes, cellular telephones and pagers, and other electronic devices, that each include a processor, a storage medium readable by the processor (including volatile and non-volatile memory and/or storage elements), at least one input device, and one or more output devices. Program code is applied to the data entered using the input device to perform the functions described and to generate output information. The output information may be applied to one or more output devices. One of ordinary skill in the art may appreciate that embodiments can be practiced with various computer system configurations, including multiprocessor systems, minicomputers, mainframe computers, and the like. Embodiments can also be practiced in distributed computing environments where tasks may be performed by remote processing devices that are linked through a communications network.

Figure 3:
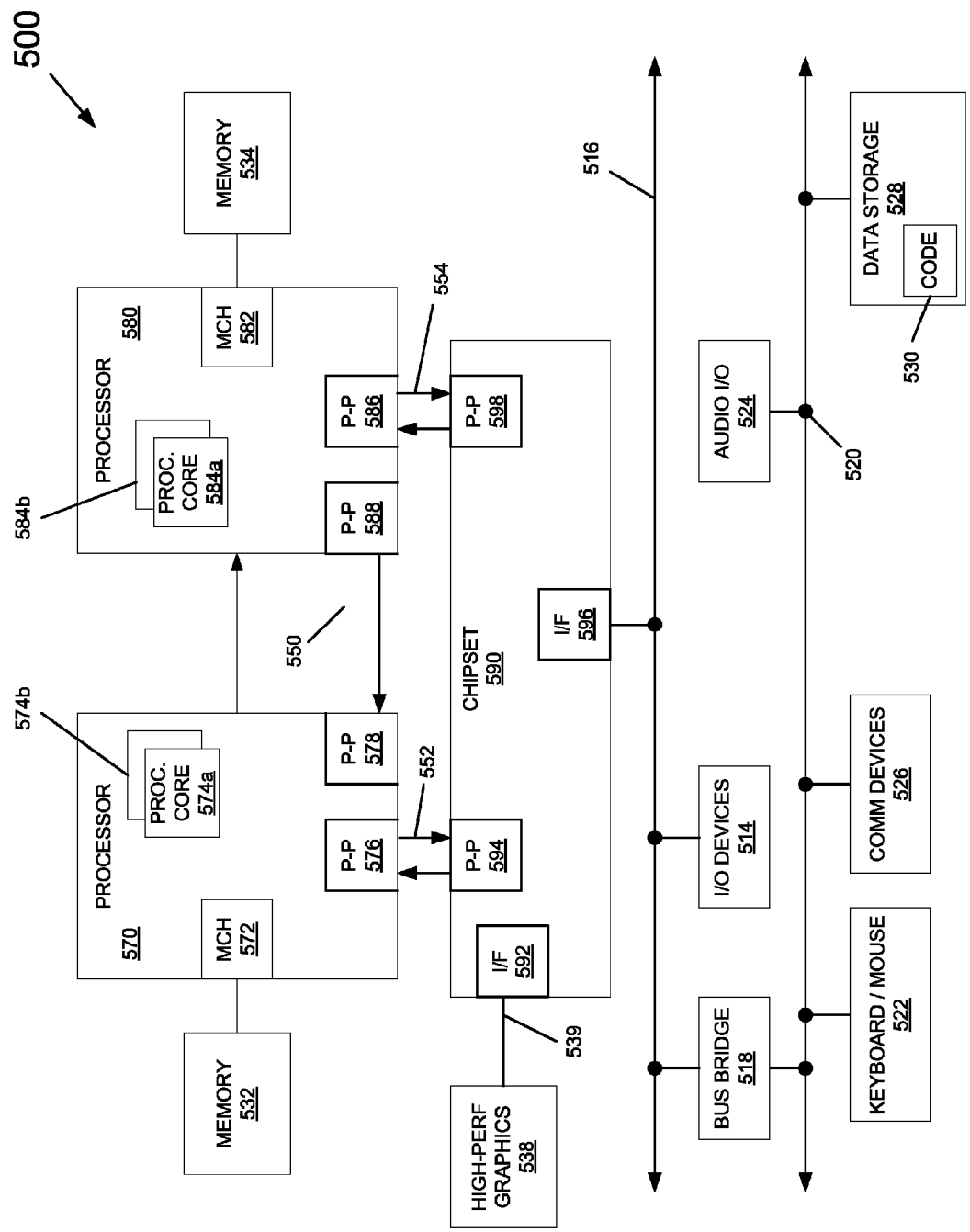
FIG. 3 is a block diagram of a system in accordance with an embodiment of the present invention.

Embodiments may be implemented in many different system types. Referring now to FIG. 3, shown is a block diagram of a system in accordance with an embodiment of the present invention. As shown in FIG. 3, multiprocessor system 500 is a point-to-point interconnect system, and includes a first processor 570 and a second processor 580 coupled via a point-to-point interconnect 550. As shown in FIG. 3, each of processors 570 and 580 may be multicore processors, including first and second processor cores (i.e., processor cores 574a and 574b and processor cores 584a and 584b). Each processor core may include hardware, software, firmware or combinations thereof to handle protection data using a protected cache in accordance with an embodiment of the present invention. For example, each core may include a L1 cache including protected cache lines, as controlled by the protection bits associated with the lines and a cache controller or other logic.

Still referring to FIG. 3, first processor 570 further includes a memory controller hub (MCH) 572 and point-to-point (P-P) interfaces 576 and 578. Similarly, second processor 580 includes a MCH 582 and P-P interfaces 586 and 588. As shown in FIG. 3, MCH's 572 and 582 couple the processors to respective memories, namely a memory 532 and a memory 534, which may be portions of main memory (e.g., a dynamic random access memory (DRAM)) locally attached to the respective processors. First processor 570 and second processor 580 may be coupled to a chipset 590 via P-P interconnects 552 and 554, respectively. As shown in FIG. 3, chipset 590 includes P-P interfaces 594 and 598.

Furthermore, chipset 590 includes an interface 592 to couple chipset 590 with a high performance graphics engine 538 via a P-P interconnect 539. In turn, chipset 590 may be coupled to a first bus 516 via an interface 596. As shown in FIG. 3, various I/O devices 514 may be coupled to first bus 516, along with a bus bridge 518 which couples first bus 516 to a second bus 520. Various devices may be coupled to second bus 520 including, for example, a keyboard/mouse 522, communication devices 526 and a data storage unit 528 such as a disk drive or other mass storage device which may include code 530, in one embodiment. Further, an audio I/O 524 may be coupled to second bus 520.

Each program may be implemented in a high level procedural or object oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the operations described herein. Alternatively, the operations may be performed by specific hardware components that contain hard-wired logic for performing the operations, or by any combination of programmed computer components and custom hardware components. The methods described herein may be provided as a computer program product that may include a machine accessible medium having stored thereon instructions that may be used to program a processing system or other electronic device to perform the methods. The term "machine accessible medium" used herein shall include any medium that is capable of storing or encoding a sequence of instructions for execution by a machine and that cause the machine to perform any one of the methods described herein. The term "machine accessible medium" shall accordingly include, but not be limited to, solid-state memories, optical and magnetic disks, and a carrier wave that encodes a data signal, while the term "machine accessible storage medium" includes only tangible components capable of such storage. Furthermore, it is common in the art to speak of software, in one form or another (e.g., program, procedure, process, application, module, logic, and so on) as taking an action or causing a result. Such expressions are merely a shorthand way of stating the execution of the software by a processing system cause the processor to perform an action and produce a result.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
    storing first protected data in a first cache line of a cache memory and storing a first indicator associated with the first cache line to indicate a protection status of the first cache line responsive to a user-level protected write instruction;
    updating a counter value if the first cache line is evicted from the cache memory;
    invoking a user-defined handler based at least in part of the counter value; and
    flushing all protected data in the cache memory on a first switch from a first thread in which the protected data was written to a second thread, and regenerating the protected data after a second switch from the second thread to the first thread and storing the protected data in the cache memory.

2. The method of claim 1, wherein the user-defined handler sends an isolation message to an operating system (OS) to request an uninterrupted interval in which to process a first application that generated the first protected data.

3. The method of claim 1, wherein the user-defined handler informs a user of an attack and halts the first application.

4. The method of claim 1, further comprising discarding the first protected data and all other protected data stored in the cache memory and restarting an application that generated the first protected data if the counter value does not exceed a threshold.

5. The method of claim 1, further comprising storing a second indicator associated with the first cache line to indicate an access status of the first cache line, and storing a third indicator associated with the first cache line to indicate an eviction permissibility of the first cache line.

6. An apparatus comprising:
    a cache memory to store a plurality of cache lines in a first address space and a second address space, the first address space maintained non-coherently to store protected data of a first application and the second address space maintained coherently to store non-protected data, the cache memory to further store protection information associated with each cache line that includes the protected data and to not store the protection information for cache lines that do not include the protected data, wherein the cache memory is to discard all protected cache lines from the cache memory if an abort scenario occurs during execution of the first application, and the first application is to re-start operation and re-generate the protected data stored in the protected cache lines after the abort scenario.

7. The apparatus of claim 6, wherein the protection information includes a first indicator to indicate that a protected cache line includes the protected data and a second indicator to indicate that the first application is to be notified if the protected cache line is evicted by another application.

8. The apparatus of claim 7, wherein the protection information includes a third indicator to indicate that the protected cache line is not to be accessed by an external agent.

9. The apparatus of claim 7, wherein the protection information includes a fourth indicator, wherein the fourth indicator is of a first state to indicate that the protected data in the protected cache line is not to be used for register-memory operations, and of a second state to allow a register-memory operation if an access request is associated with an instruction including a secure prefix.

10. The apparatus of claim 7, further comprising a core coupled to the cache memory, wherein the cache memory is to notify the core if a protected cache line including the protected data is evicted if the second indicator is set.

11. The apparatus of claim 6, wherein the first address space cannot be snooped by a simultaneous multithreading (SMT) thread that shares the cache memory.

12. The apparatus of claim 6, wherein the first application is to send an isolation request to an operating system if a protected cache line is evicted greater than a threshold number of times.

13. The apparatus of claim 6, wherein the cache memory is to write the protected data to a protected cache line and set a first indicator responsive to a user-level protected write instruction.

14. The apparatus of claim 6, wherein the cache memory is to read the protected data from a protected cache line responsive to a user-level protected read instruction from an application that wrote the protected data to the cache memory.

15. The apparatus of claim 6, wherein the cache memory is to prevent protected data of a protected cache line responsive to a read instruction from a thread that did not write the protected data to the cache memory.

16. A system comprising:
    a processor including a first core and a cache memory coupled to the first core, wherein the cache memory includes a cache controller to write protected data into a cache line responsive to a protected write instruction received from a first thread, to allow the protected data to be read responsive to a protected read instruction received from the first thread, to store a first indicator to indicate that a cache line includes the protected data and a second indicator to indicate that the first thread is to be notified if the cache line is evicted by another thread, and wherein the first thread is to send an isolation message to an operating system (OS) to request an uninterrupted interval if a cache line including protected data of the first thread and having an associated set second indicator is evicted and a counter value associated with protected data evictions exceeds a threshold; and
    a dynamic random access memory (DRAM) coupled to the processor.

17. The system of claim 16, wherein the processor is to execute a digital rights management (DRM) application that is to use the cache memory.

18. The system of claim 16, wherein the processor is to execute an application to handle and manipulate cryptographic keys using the cache memory.

* * * * *